United States Patent
Matusevich et al.

(10) Patent No.: US 6,535,733 B1
(45) Date of Patent: Mar. 18, 2003

(54) MEASUREMENT RADIO SYSTEM FOR PRODUCING OPERATING INFORMATION FOR TRAFFIC RADIOS

(75) Inventors: Alex Matusevich, Morris Plains, NJ (US); Myles Patrick Murphy, Annandale, NJ (US); James Paul Seymour, Lake Hiawatha, NJ (US); Sheng-Jen Tsai, Bridgewater, NJ (US); Chris Constantine Tsamutalis, Long Valley, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,667

(22) Filed: Aug. 31, 1998

(51) Int. Cl.$^7$ ................................................. H04Q 7/20
(52) U.S. Cl. ........................ 455/424; 455/67.1; 455/561
(58) Field of Search ............................... 455/424, 561, 455/562, 67.1, 277.2

(56) References Cited

U.S. PATENT DOCUMENTS

| | | | | |
|---|---|---|---|---|
| 4,761,822 A | * | 8/1988 | Maile ........................... | 455/82 |
| 5,193,109 A | * | 3/1993 | Chien-Yeh Lee ............ | 379/60 |
| 5,499,397 A | * | 3/1996 | Wadin ....................... | 455/277.1 |
| 5,507,035 A | * | 4/1996 | Bantz et al. ................. | 455/133 |
| 5,781,864 A | | 7/1998 | Reudink ...................... | 455/560 |
| 5,870,681 A | * | 2/1999 | Myer .......................... | 455/582 |
| 5,999,522 A | * | 12/1999 | Rohani ........................ | 370/331 |
| 6,006,113 A | * | 12/1999 | Meredith ..................... | 455/562 |
| 6,032,056 A | * | 2/2000 | Reudink ...................... | 455/560 |
| 6,038,459 A | * | 3/2000 | Searle et al. ................. | 455/562 |
| 6,052,605 A | * | 4/2000 | Meredith et al. ............ | 455/561 |

FOREIGN PATENT DOCUMENTS

EP       0725498 A1    8/1996    ............ H04B/7/04

* cited by examiner

Primary Examiner—Thanh Cong Le
Assistant Examiner—Lana Le (57) ABSTRACT

A measurement radio system uses a measurement radio to scan active channels of a base station and produce operating information for the traffic radios servicing the active channels. The measurement radio can produce operating information, such as signal strength, bit error rate (BER), frame error rate (FER) and signal to interference ratio (C/I), which is used to determine whether to change the manner in which the traffic radio is servicing the active channel. For example, if the measurement radio can switch between different sets of antennas, the measurement radio can scan an active voice/data channel using a different set of antennas than the traffic radio is using to service the active channel and determine operating information related to the signal received over the active channel using the different set of antennas. The traffic radio can use the operating information to determine whether to hand off the active channel to the different set of antennas. The measurement radio can determine operating information, such as operating coefficients, parameters or settings, to change how the traffic radio services the active channel.

26 Claims, 7 Drawing Sheets

MEASUREMENT RADIO SYSTEM FOR PRODUCING OPERATING INFORMATION FOR TRAFFIC RADIOS

BACKGROUND OF THE INVENTION

1. Field of The Invention

This invention relates to wireless communications and, more particularly, to a measurement radio system in a wireless communications station for providing operating information to traffic radios.

2. Description of Related Art

Figure 1:
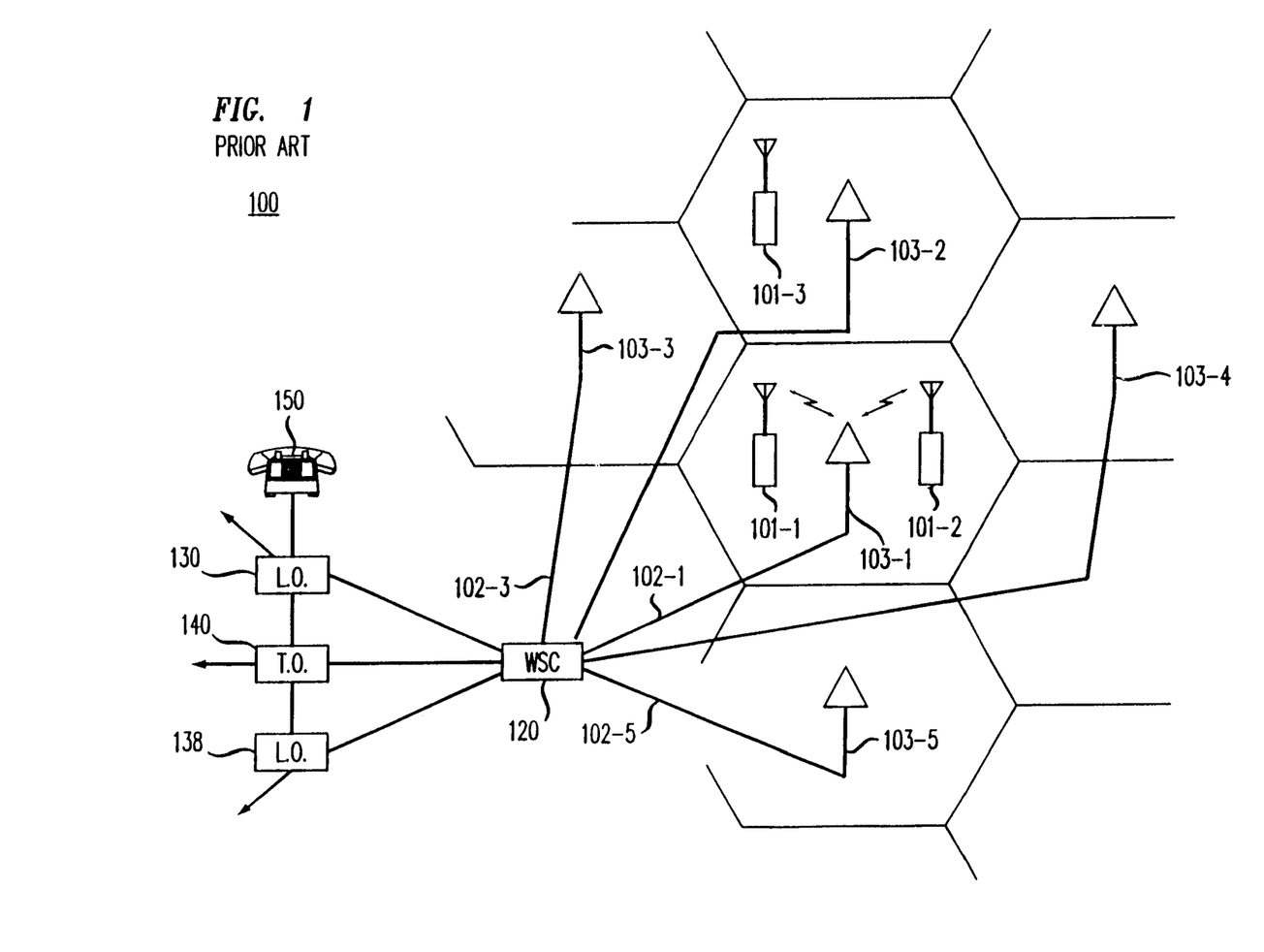
FIG. 1 shows a general diagram of a portion of a typical wireless telecommunications system.

FIG. 1 depicts a schematic diagram of a portion of a typical wireless telecommunications system, which provides wireless telecommunications service to a number of wireless terminals (e.g., wireless terminals 101-1 through 101-3) that are situated within a geographic region. The heart of a typical wireless telecommunications system is a Mobile Switching Center ("MSC") 120, which might be known also as a Wireless Switching Center ("WSC") or a Mobile Telephone Switching Office ("MTSO"). Typically, the Mobile Switching Center 120 is connected to a plurality of base stations (e.g., base stations 103-1 through 103-5) that are dispersed throughout the geographic area serviced by the system and to the local and long-distance telephone offices (e.g., local-office 130, local-office 138 and toll-office 140). The Mobile Switching Center 120 is responsible for, among other things, establishing and maintaining calls between the wireless terminals and calls between a wireless terminal and a wireline terminal (e.g., wireline terminal 150), which wireline terminal is connected to the Mobile Switching Center 120 via the local and/or long-distance networks.

The geographic area serviced by a wireless telecommunications system is divided into spatially distinct areas called "cells." As depicted in FIG. 1, each cell is schematically represented by one hexagon in a honeycomb pattern; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Mobile Switching Center 120. For example, when wireless terminal 101-1 desires to communicate with wireless terminal 101-2, wireless terminal 101-1 transmits the desired information to base station 103-1, which relays the information to Mobile Switching Center 120. Upon receipt of the information, and with the knowledge that it is intended for wireless terminal 101-2, Mobile Switching Center 120 then returns the information back to base station 103-1, which relays the information, via radio, to wireless terminal 101-2.

Figure 2:
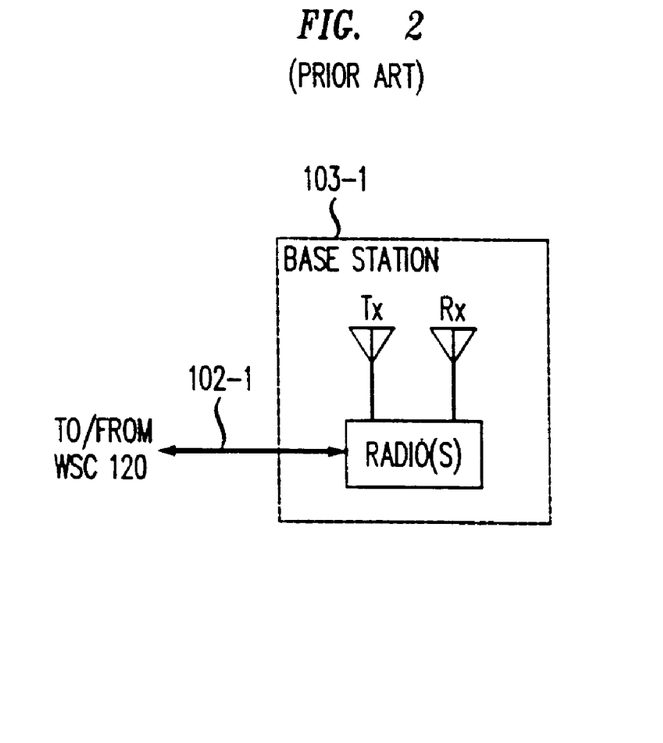
FIG. 2 shows a general block diagram of a base station architecture in the prior art.

FIG. 2 depicts a block diagram of a first base station architecture in the prior art, which comprises one or more radios that are capable of transmitting outgoing signals via a transmit antenna ("TX") and receiving incoming signals via a receive antenna ("Rx"). According to this architecture, there is only one transmit antenna per cell that transmits omni-directionally and only one receive antenna per cell that receives omni-directionally. Each radio in this architecture receives one incoming carrier signal via the receive antenna and demodulates that carrier signal into one or more baseband signals in accordance with the particular access scheme employed (e.g., frequency-division multiple access, time-division multiple access, code-division multiple-access, etc.). The incoming baseband signals are then transmitted to wireless switching center 120. Analogously, outgoing baseband signals from wireless switching center 120 are modulated by the radio in accordance with the particular multiplexing scheme employed (e.g., frequency-division multiplexing, time-division multiplexing, code-division multiplexing, etc.) for transmission via the transmission antenna.

When wireless telecommunications system 100 is a terrestrial system, in contrast to a satellite-based system, the quality and availability of service is subject to the idiosyncrasies of the terrain surrounding the system. For example, when the topography of the terrain is hilly or mountainous, or when objects such as buildings or trees are present, a signal transmitted by a wireless terminal can be absorbed or reflected such that the signal quality is not uniform at the base station. As such, many independent paths result from the scattering and reflection of a signal between the many objects that lie between and around the mobile terminal and the base station. The scattering and reflection of the signal creates many different "copies" of the transmitted signal ("multipath signals") arriving at the receive antenna of the base station with various amounts of delay, phase shift and attenuation. As a result, the signal received at the base station from the mobile unit is made up of the sum of many signals, each traveling over a separate path. Since these path lengths are not equal, the information carried over the radio link will experience a spread in delay as it travels between the base station and the mobile station. The amount of time dispersion between the earliest received copy of the transmitted signal and the latest arriving copy having a signal strength above a certain level is often referred to as delay spread. Delay spread can cause intersymbol interference (ISI). In addition to delay spread, the same multipath environment causes severe local variations in the received signal strength as the multipath signals are added constructively and destructively at the receive antenna of the base station. This phenomenon is widely known as multipath fading or fast fading or Rayleigh fading.

Figure 3:
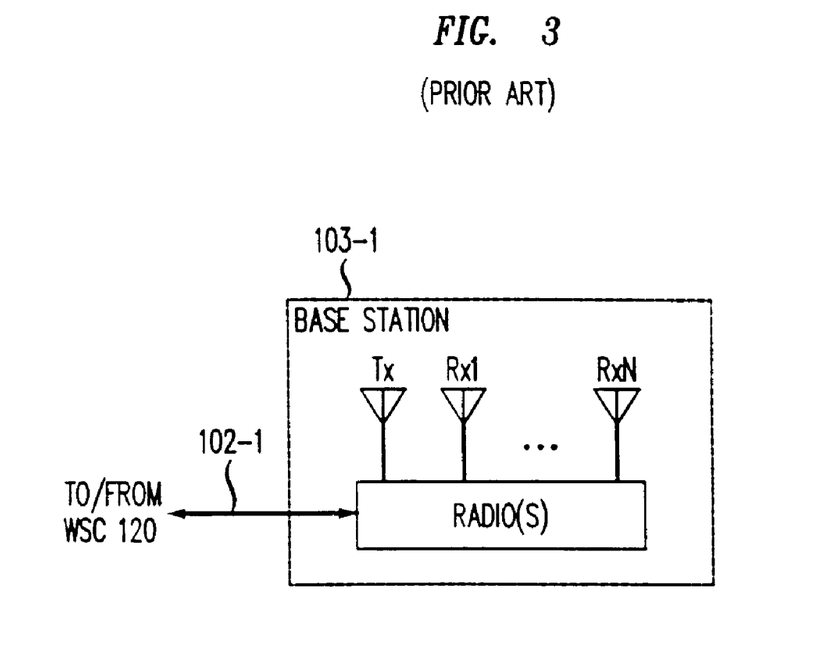
FIG. 3 shows a general block diagram of another embodiment of a base station architecture in the prior art.

FIG. 3 depicts a block diagram of a second base station architecture in the prior art, which supports a technique known as N-way receive diversity to mitigate the effects of multipath fading. The base station architecture depicted in FIG. 3 comprises one or more radios that are capable of transmitting outgoing signals via a single transmit antenna, as in the architecture of FIG. 2, but also comprises N spatially-separate receive antennas ("Rx1" through "RxN"). Because multipath fading is a localized phenomenon, it is highly unlikely that all of the spatially separated receive antennas will experience multipath fading at the same time. Therefore, if an incoming signal is weak at one receive antenna, it is likely to be satisfactory at one of the others. As is well-known in the prior art, a diversity combiner associated with the radios can combine N incoming signals, each from one of N receive antennas, using various techniques (e.g., selection diversity, equal gain combining diversity, maximum ratio combining diversity, etc.) to improve the reception of an incoming signal.

Figure 4:
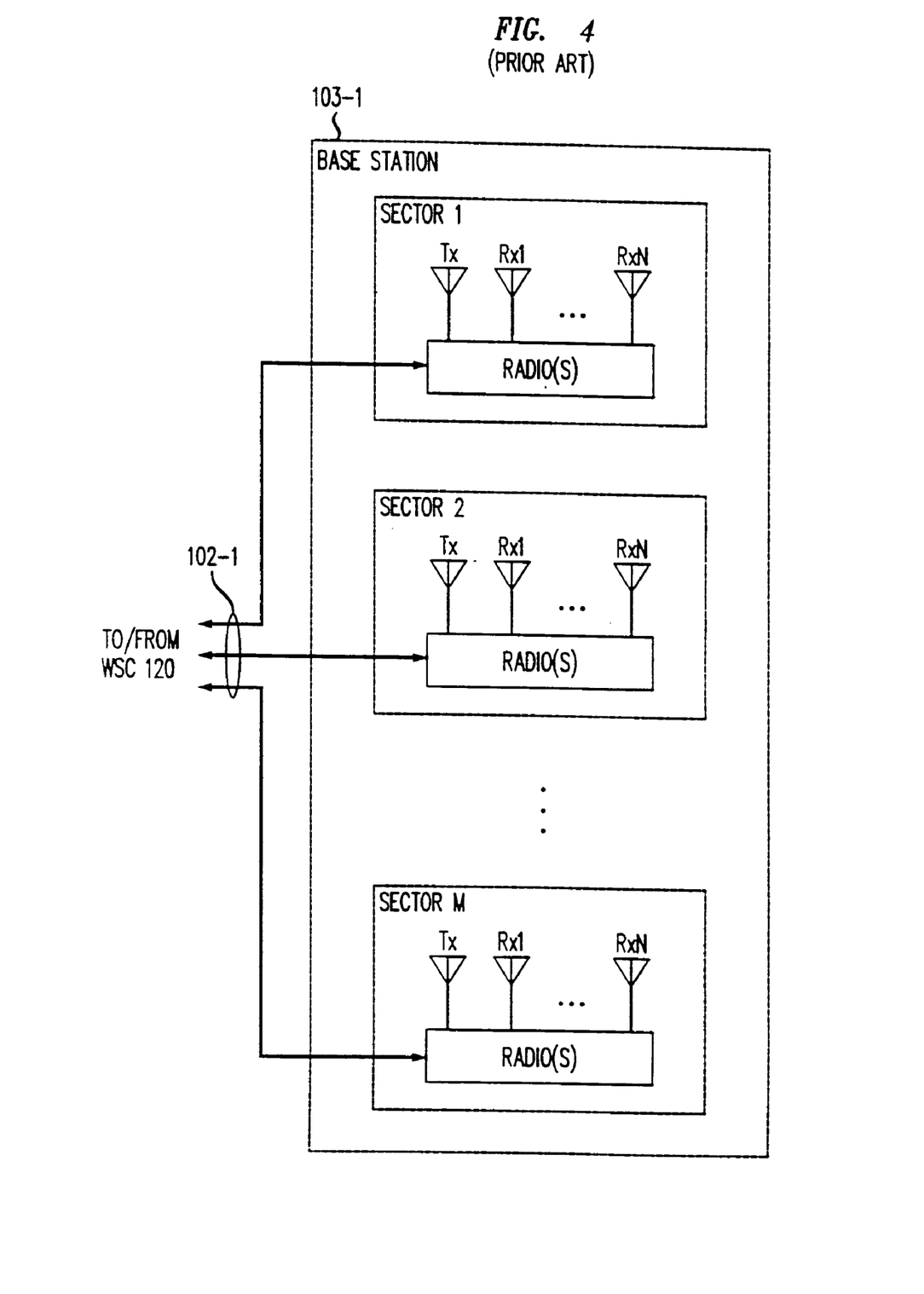
FIG. 4 shows a general block diagram of another embodiment of a base station architecture in the prior art.

FIG. 4 depicts a block diagram of a third base station architecture in the prior art, which supports a technique for increasing the traffic capacity of the telecommunications system. This technique is known as "base station sectorization." In accordance with base station sectorization, the cell serviced by a base station is subdivided into M tessellated pie-slices, each of which comprises a 360°/M sector whose focus is at the base station. The base station architecture in FIG. 4 comprises M sets of radios and associated transmit and receive antennas, as shown, each of which operates independently of the others, except that the transmit and receive antennas associated with each sector are generally implemented so as to principally transmit into and receive from that sector.

Figure 5:
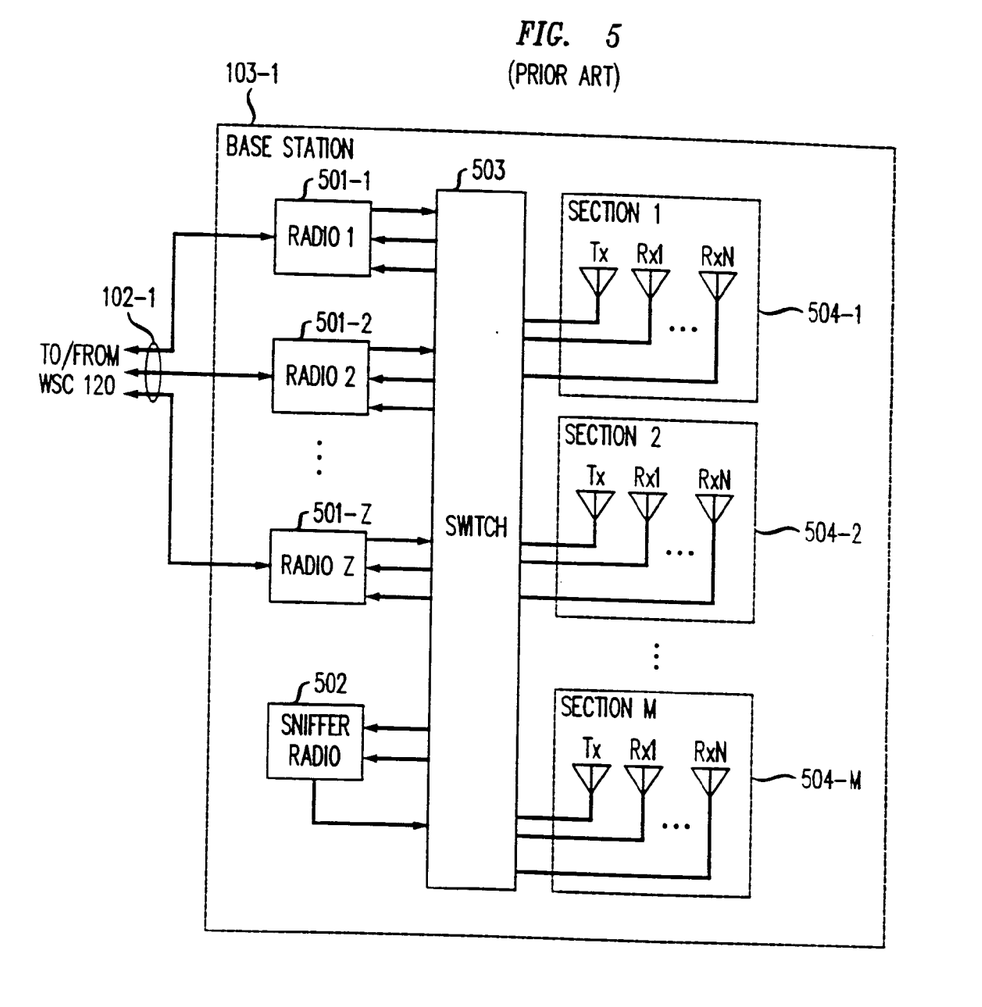
FIG. 5 shows a general block diagram of yet another embodiment of a base station architecture in the prior art.

The architecture in FIG. 4 is, however, disadvantageous because it requires more radios than necessary to support a given traffic capacity, which unnecessarily increases the cost of the base station. The same average traffic capacity can be accommodated with fewer radios if they are pooled, as depicted in FIG. 5. FIG. 5 depicts a block diagram of a fourth base station architecture in the prior art, which supports receive diversity, sectorization, and radio pooling. The architecture comprises: a plurality of radios 501-1 through 501-Z, sniffer radio 502, switch matrix 503, and M sets of transmit and receive antennas 504-1 through 504-M, interconnected as shown. In accordance with this architecture, sniffer radio 502 scans all of the potential sectors and channels in search of incoming signals. When sniffer radio 502 detects an incoming signal from a given sector, it directly controls the switch matrix 503 to route the incoming signals from that sector to an appropriate radio and to route the outgoing signals from that radio to the same sector. Because any radio can receive from and transmit to any sector, this architecture requires fewer radios to support the same average traffic capacity as the architecture in FIG. 4. Because the sniffer radio 502 acts as a master radio and is responsible for switching to a set of antennas for the traffic radios 501-1-501Z, the sniffer radio can become a bottleneck in the operation of the system. For example, if a mobile unit engaged in a call with the base station moves from one sector to another, but the sniffer radio 502 is late in determining that the mobile unit has moved into another sector which requires a different set of antennas, the call might be dropped to the base station. Furthermore, the baseband processing of the radios in the architectures of FIG. 1–5 have limited ability beyond those described when servicing a dedicated voice/data channel because of cost, size, and processor performance.

SUMMARY OF THE INVENTION

The present invention involves a measurement radio system which uses a measurement radio to scan active channels of a base station and produce operating information for the traffic radios servicing the active channels. The measurement radio can produce operating information, such as signal strength, bit error rate (BER), frame error rate (FER) and signal to interference ratio (C/I), which is used to determine whether to change the manner in which the traffic radio is servicing the active channel. For example, if the measurement radio can switch between different sets of antennas, the measurement radio can scan an active voice/data channel using a different set of antennas than the traffic radio is using to service the active channel and determine operating information related to the signal received over the active channel using the different set of antennas. The traffic radio can use the operating information to determine whether to hand off the active channel to the different set of antennas.

The measurement radio can determine operating information, such as operating coefficients, parameters or settings, to change how the traffic radio services the active channel. For example, if the active channel is to be handed off to a different set of antennas, the measurement radio can provide automatic gain control (AGC) settings for the traffic radio to use in servicing the active channel using the different set of antennas. As such, the measurement radio can provide seamless handoffs between different sets of antennas because the traffic radio already has the operating settings corresponding to the active call on the different set of antennas. The measurement radio can determine other operating information to change the manner in which the traffic radio services the active channel. For example, the measurement radio can provide filter coefficients, equalizer coefficients, or operating coefficients for the receive algorithms of the traffic radios, such as coefficients related to the speed of the mobile terminal on an active channel. The measurement radio can also provide operating information related to the active channel conditions, such as information related to delay spread conditions and the speed of the mobile terminal. In certain embodiments, the delay spread information can determine whether the traffic radio uses differential detection or equalization to service the active channel.

The measurement radio can also scan the transmissions of the traffic radios. In response to the transmissions of a traffic radio, the measurement radio can send operating information to the traffic radio that determines how the traffic radio transmits over the active channel. For example, the measurement radio could send operating coefficients or parameter to the traffic radios to change the respective phase, amplitude and/or output power of individual symbols transmitted over respective active voice/data channels of the entire base station.

The measurement radio can provide operating information to the traffic radios as parameters or coefficients updated in dedicated storage locations corresponding to the respective traffic radios and/or the respective active channels or sent over a radio communication bus to dedicated addresses or at a dedicated time slot for the traffic radios and/or the respective active channels. The measurement radio can periodically provide operating information to the traffic radio or in response to a request by the traffic radio or the MSC. Alternatively, the measurement radio can produce the operating information to the MSC or a base staton controller which determines the appropriate operating information to produce to the traffic radio.

BRIEF DESCRIPTION OF THE DRAWINGS

Other aspects and advantages of the present invention may become apparent upon reading the following detailed description and upon reference to the drawings in which.

DETAILED DESCRIPTION

Figure 6:
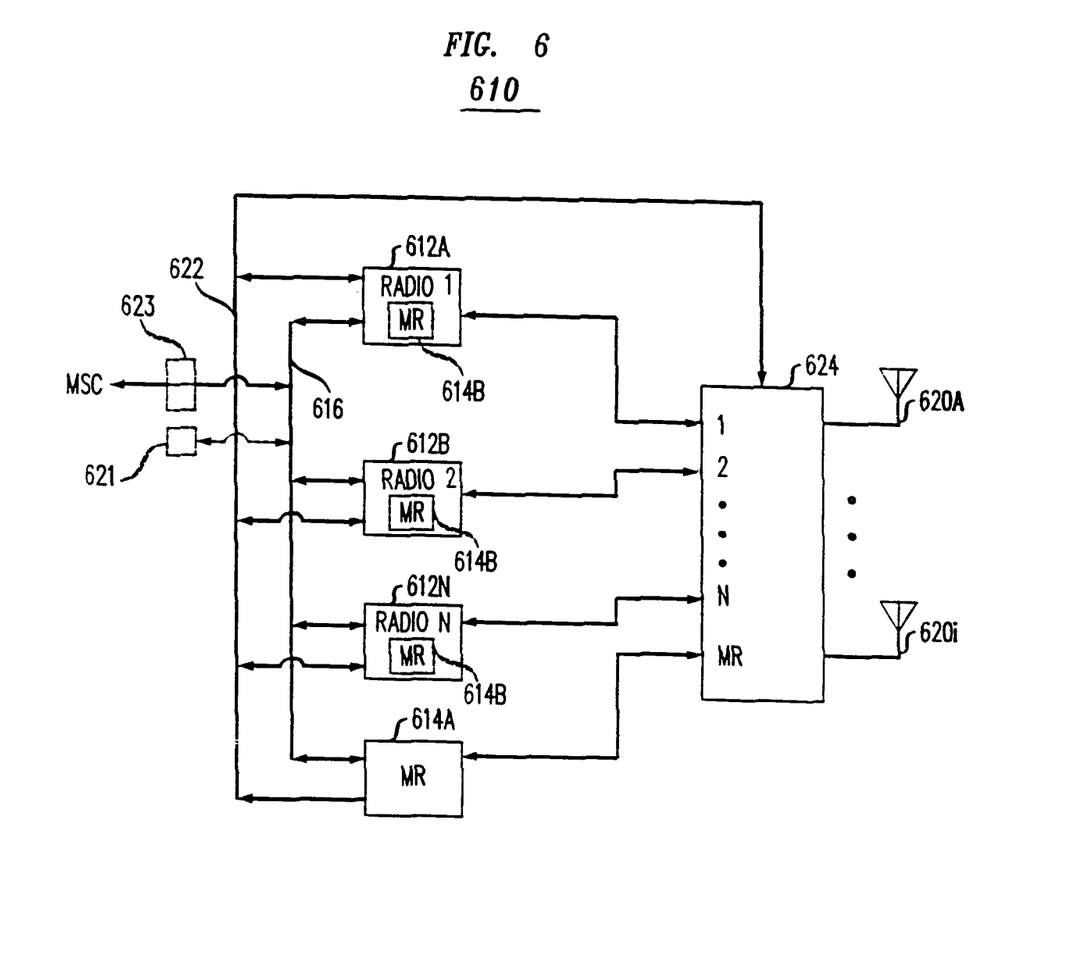
FIG. 6 shows a measurement radio system according to the principles of the present invention.

An illustrative embodiment of a measurement radio system according to the principles of the present invention is described below. With particular reference to FIG. 6, a measurement radio architecture 610 includes N radios 612a–n which are dedicated voice/data channel radios (traffic radios). A measurement radio 614 scans the active voice/data channels (those channels in use) to determine operating information for the traffic radios 612a–n using the same and/or different antenna(s) as those being used by the traffic radios 612a–n to service the active channels depending on the embodiment. In this particular embodiment, the measurement radio 614 can switch to a selected combination or active set of antennas 620a–i by sending antenna switching signals over an antenna radio control bus 622 to an antenna splitter/combiner network 624. A set of antennas 620a–i can comprise only one antenna 620a–i. By scanning the active voice/data channels and switching between the sets of antennas 620a–i, the measurement radio 614 can scan an active channel using different sets of antennas 620a–i to provide operating information for the active channel based on different sets of antennas 620a–i. Using this information, the measurement radio can provide operating information related to the signal quality for an active channel using a different set of antennas than the traffic radio servicing the active call. For example, the measurement radio 614 can provide antenna selection information, such as signal strength, bit error rate (BER), frame error rate (FER) or signal to interference ratio (C/I) for a set or sets of antennas. Using this information the traffic radio 612a–n can decide whether to switch to a different set of antennas 620a–i corresponding to the operating information provided by the measurement radio 614. Alternatively, the traffic radio 612a–n could provide operating information on the active channel using the current set of antennas 620a–i, and the measurement radio 614 determines whether a different set of antennas 620a–i is more desirable and provide such desired antenna selection information to the traffic radio 612a–n. Additionally, the operating information could be stored in dedicated storage locations 621 or time slots which are accessible to the measurement radio 614.

Scanning the active channel using any combination or set of antennas 620a–i may not be not possible (for example, if only particular sets of antennas 620a–i or a particular antenna 620a–i can be used), may not be practical or may not be desirable (for example, the current set of antennas 620a–i being used by the traffic radio produces certain operating information below and/or above thresholds indicating that switching antennas is not necessary). For example, aspects of the measurement radio system can be used in any antenna and/or antenna switching architecture, such as those described for the architectures of FIGS. 1–5, as would be understood by one of ordinary skill in the art with the benefit of this disclosure. In any event, the measurement radio 614 determines operating information relating to the active channel (using the same set of antennas or antenna 620a–i as being used by the traffic radio 612 to service the active channel and/or a different set(s) of antennas or antenna 620a–i) in the form of measurement data and/or actual operating parameters, settings or coefficients. In response to the operating information, the traffic radio 612a–n servicing the active channel can change to a desired manner of servicing the active channel and/or use operating information produced by the measurement radio 614 in servicing the active channel.

In this particular embodiment, the measurement radio 614 uses the same hardware and is arranged within the architecture 610 the same way as the voice/data channel radios 612a–n. As such, the measurement radio 614 uses the same RF path as the traffic radios 612a–n. In doing so, the measurement radio architecture can be implemented in an existing base station architecture by converting a voice/data channel radio into a measurement radio 614 with some relatively minor changes in software, firmware and/or hardware. Alternatively, a dedicated measurement radio 614a need not be used, and any traffic radio or radios 612a–m can operate as a measurement radio or radios 614b. As such, if a current radio 612a–n operating as the measurement radio 614b goes out of service, a different radio 612a–n can be designated as the measurement radio 614. Thus, the measurement radio architecture does not require a particular radio designated as the measurement radio 614, and the measurement radio architecture can operate on a different traffic radio or radios 612a–n. In such an architecture, the radios 612a–n and 614 can operate as traffic radios and/or as measurement radios depending on the embodiment. Consequently, in periods of light traffic or if desirable, multiple voice/data radios 612a–n can as measurement radios 614b to share the load of gathering operating information. As traffic load changes or other reasons, the number of radios operating as a measurement radio can change. In periods of heavy traffic or of operating problems where radios are going out of service, the measurement radio(s) 614b operating on a traffic radio(s) 612a–n or even the dedicated measurement radio 614a can give up the measurement radio function and operate as a traffic radios.

To switch to a set of antennas 620a–i in this embodiment, the measurement radio 614 and the voice/data radios 612a–n can send antennas selection signals over an antenna radio control bus 622 to the antenna splitter/combiner/switch network 624 which provides the different sets of antennas 620a–i as would be understood by one of ordinary skill in the art. In accordance with certain principles of the present invention, the measurement radio 614 scans an active channel using different sets of antennas 620a–i and determines, based on certain criteria, such as gain and/or signal quality, antenna selection information related to each set of antennas 620a–i for the active channel. The antenna selection information can take the form of antenna selection signals or information related thereto which is sent over the radio communications bus 616 to the traffic radio 612a–n. In response to this operating information, the traffic radio 612a–n can switch to the desired set of antennas 620a–i for servicing the active channel.

By switching to a different set of antennas 620a–i for the active channel, the traffic radio 612a–n can lose some data while some operating parameters, such as automatic gain control (AGC) coefficients, filter coefficients, or equalizer coefficients are being determined by or for the traffic radio for the new set of antennas 620a–i. To avoid losing data while the operating parameters for the new set of antennas 620a–i is being determined, the measurement radio 614 can provide operating information to the traffic radio 612a–n for the new set of antennas 620a–i, such as the AGC coefficients, filter coefficients and equalizer coefficients. As such, a relatively seamless hand off for the active channel can occur from a current set of antennas 620a–i to another set of antennas 620a–i. In situations where different sets of antennas 620a–i service different sectors for the cell, the measurement radio 614 can provide relatively seamless handoffs for the active call between the sectors of the cell by providing the operating coefficients for the new set of antennas 620a–i to which the active call is being handed off.

For a traffic radio 612a–n servicing an active channel using a particular set of antennas or antenna 620a–i, the measurement radio 614 can provide a variety of operating information, including a variety of measurements of the active channel and/or a variety of operating parameters based on measurements of the active channel, using the same and/or different sets of antennas or antenna 620a–i as being used by the traffic radio 612 servicing the active channel. For example, the measurement radio 614 can measure the signal to noise (S/N) ratio of the active channel, power levels, bit error rate (BER), frame error rate (FER), or other signal quality measurements and provide this operating information to the active radios 612a–n, the MSC, and/or a base station controller 623. Furthermore, the measurement radio 614 can use these and other measurements to provide other operating information to the traffic radio 612a–n, the MSC and/or a base station controller 623.

Operating information related to the demodulation scheme used by the traffic radio 612a–n can be determined and provided to the traffic radio 612a–n. For example, in a time division multiple access (TDMA) base station architecture, differential detection with an infinite input response (IIR) filtering can be used to improve receiver performance. A weight α of the IIR filter is an operating parameter which is between 0 and 1. For an traffic channel, the weight α is typically set at about 0.4 because α=0.4 works well for all typical mobile speeds. The measurement radio 614, however, can determine an actual α for the active channel by using different α's and performing measurements to determine which value has improved performance. The measurement radio 614 can then provide this operating parameter, which is related to the speed of the mobile unit on the active channel, to the traffic radio 612a–n. In response, the traffic radio 612a–n sets the weight α for its IIR filtering according to the operating information (which can be the actual operating parameter α) sent by the measurement radio 614. Accordingly, the measurement radio 614 can determine and provide other operating information to change the operation of the traffic radio 612a–n while servicing the active channel, such as operating information which indicates the speed of the mobile terminal.

The measurement radio 614 can scan an active channel using the same and/or a different set of antennas or antenna 612a–i as the traffic channel servicing the active channel to determine delay spread conditions for the active channel using the same and/or different set of antenna(s) 620a–i. The measurement radio 614 can use the measured delay spread conditions to provide operating parameters to improve the demodulation of the communication signals over the active channel. For example, in order to demodulate communication signals on the active channel with a delay spread of greater than 10 microseconds, the traffic radio 612a–n can use an equalization technique to demodulate received communication signals from the active channel which is known to those skilled in the art. If the delay spread is less than 10 microseconds, then a differential detection technique can be used to demodulate the received communications signals from the active channel which is known to those skilled in the art. Typically, the decision to use equalization or differential detection is based on a determination by the traffic radio 612a–n of which technique to use. Using the measurement radio architecture 610, the measurement radio 614 can more accurately measure the delay spread of the active channel and provide the delay spread to the traffic radio 612a–n which more accurately determines whether to use equalization or differential detection. The measurement radio 614 could simply make the determination based on the measured delay spread and provide this operating information to the traffic radio 612a–n. Alternatively, the measurement radio 614 could simply scan the active channel and demodulate the received communications signal using differential detection or equalization and determine which technique results in improved performance, for example by using respective BERs to determine if equalization or differential detection results in improved performance. Additionally, if the delay spread conditions change, the measurement radio 614 could provide changing operating information to the active radio 612a–n on which technique to use or for dynamically determining which technique to use throughout the active call.

The measurement radio 614 can also scan the transmissions of the active radios 612a–n using a selected set of antenna(s) 620a–i. In response to the scanning of the transmissions of a traffic radio 612a–n, the measurement radio 614 can send operating information to the traffic radio 612a–n to determine how the traffic radio transmits over the active channel. For example, the measurement radio 614 could send operating coefficients over the radio communications bus 616 (and/or through storage location 621) to the traffic radios 612a–n to change the respective phase, amplitude and/or output power of individual symbols transmitted over respective active voice/data channels of the entire base station 610.

The measurement radio 614 can provide the operating information to a particular traffic radio 612a–n as coefficients which the traffic radio 612a–n receives and changes its operation accordingly. For example, the voice/data channel radios 612a–n and the measurement radio 614 are connected to the radio communication bus 616 with dedicated addresses for sending and receiving information corresponding to a particular operating coefficient and a particular radio 612a–n. As such, the measurement radio 614 sends out operating information and/or coefficient(s) in the form of a packet of information over the radio communications bus 616 to a target address corresponding to operating information for the traffic radio 612a–n. Alternatively, the measurement radio 614 could periodically send a block of data and/or operating information over the radio communications bus 616 at appropriate times, and the target traffic radios 612a–n receive the respective operating information. The measurement radio 614 could also maintain a storage or memory 621 with the different addresses corresponding the different operating information for the different traffic radios 612a–n and/or corresponding to different operating parameters for the active channel for the same set (as the traffic radio servicing the call) and/or different set(s) of antenna(s) 620a–i. As such, the traffic radios 612a–n can retrieve their operating information or operating information corresponding to the same and/or a different set(s) of antenna(s) 620a–i from the corresponding memory locations updated by the measurement radio 614. Other arrangements for providing the operating information from the measurement radio 614 to the traffic radios 612a–n are possible as would be understood by those of skill in the art, for example by using the controller 623.

Figure 7:
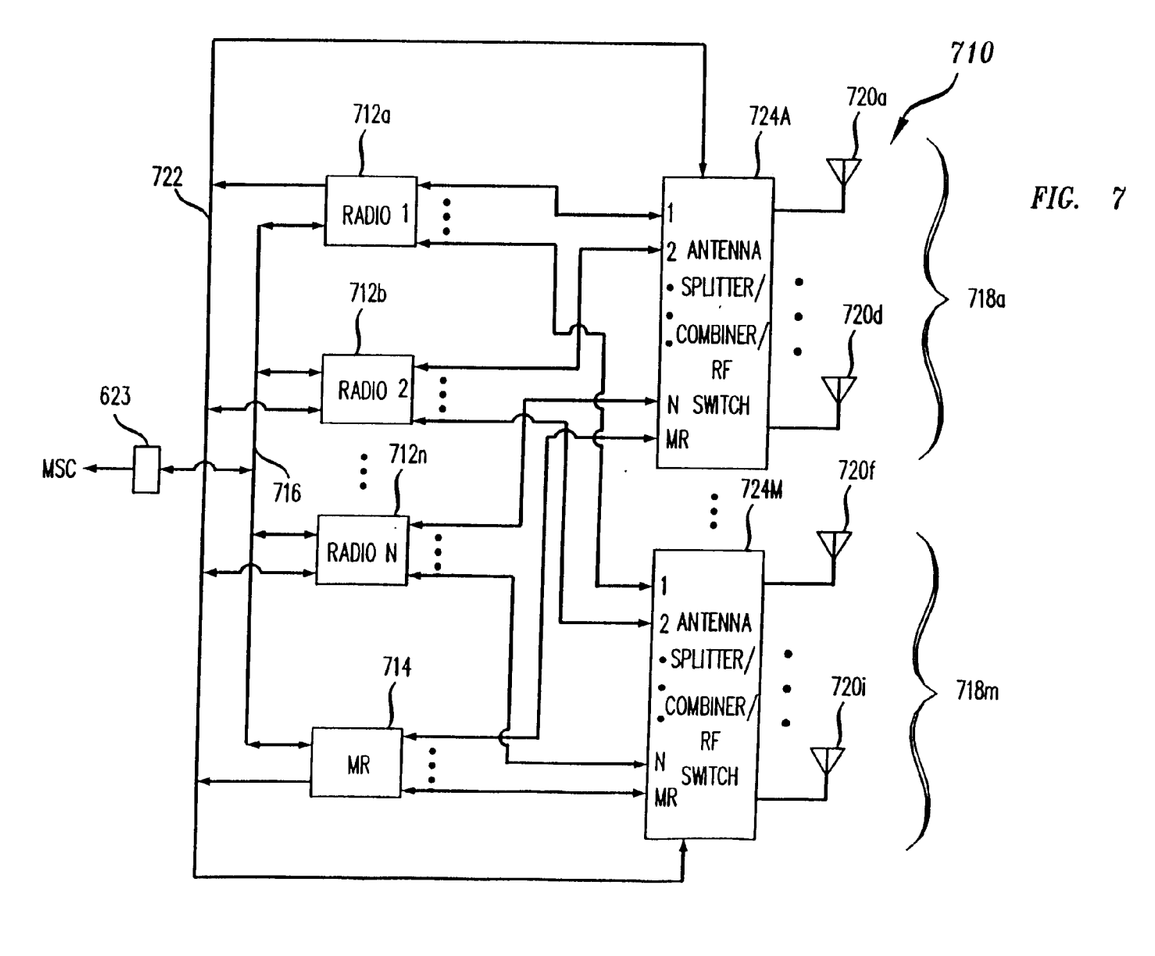
FIG. 7 shows another embodiment of a measurement radio system.

FIG. 7 shows a particular embodiment of the measurement radio architecture 710 of FIG. 6 which includes the n radios 712a–n which are dedicated voice/data channel radios. The measurement radio 714 scans the active voice/data channels (those channels in use) to determine operating information for the traffic radios 712a–n using particular sets of antennas 720a-I which provide antenna diversity. In this embodiment, antenna groups 718a–m correspond to portions (for example, a sector) of the geographic region (for example, a cell) serviced by the base station 710. The antennas of those antenna groups 718a–m correspond to subsections (for example, subsectors) of the geographic region covered by the antenna group 718a–m. In this embodiment, a selected set of antennas 720a–i comprise antennas from different antenna groups 718a–m corresponding to the same portion of the geographic region serviced by the base station 710. Moreover, each antenna of the set corresponds to the same subsection (for example, the same subsector) of the same geographic portion covered by the different antenna groups 718a–m. Because each different antenna group 718a–m corresponding to the same geographic portion is spatially separated from the other, a set of antennas 720a–i selected from the corresponding different groups 718a–m and corresponding to the same geographic subsection (for example, a subsector) provide spatial diversity.

Some embodiments can select sets of antennas, which correspond to the same, overlapping, adjacent or different geographic regions, portions or subsections by selecting antennas 720a–i from groups 718a–m corresponding to the same geographic region (for example, sector) and/or from other groups 718a–m corresponding to different, overlapping or adjacent geographic regions (for example, other sectors). In some embodiments, the selected set of antennas can be selected from only groups 718a–m covering the same geographic region (for example, the same sector). In such embodiments, the selected set of antennas can comprise a single antenna from each group 718a–m of the first groups 718a–m, where the selected set of antennas correspond to the same portion of the geographic region (for example, the same subsector). In other embodiments, the selected set of antennas for a particular active channel can be selected from the first groups 718a–m and/or from other subset(s) of groups 718a–m such that the selected set of antennas can correspond to the same, overlapping, adjacent or different geographic regions (for example, subsectors in the same sectors and/or subsectors in different sectors). The selected set of antennas can include multiple antennas from a group 718a–m of antennas and a single, multiple or no antennas from another group 718a–m of antennas 720a–i. Alternatively, the selected set of antennas 720a–i can be a single antenna or any combination of antennas 720a–i, and the antennas 720a–i can be configured in various orientations to cover changing, overlapping, adjacent or different geographic regions.

The measurement radio 714 can switch to a selected set of antennas by sending antenna switching signals over an antenna radio control bus 722 to antenna splitter/combiners/switches 724a–m corresponding to the respective groups 718a–m of antennas as would be understood by one of ordinary skill in the art. By scanning the active voice/data channels and switching between different combinations or sets of antennas, the measurement radio 714 can scan an active channel using different sets of antennas which cover the same, adjacent, overlapping or different geographic regions and provide operating information for the active channel based on the different sets of antennas.

Figure 8:
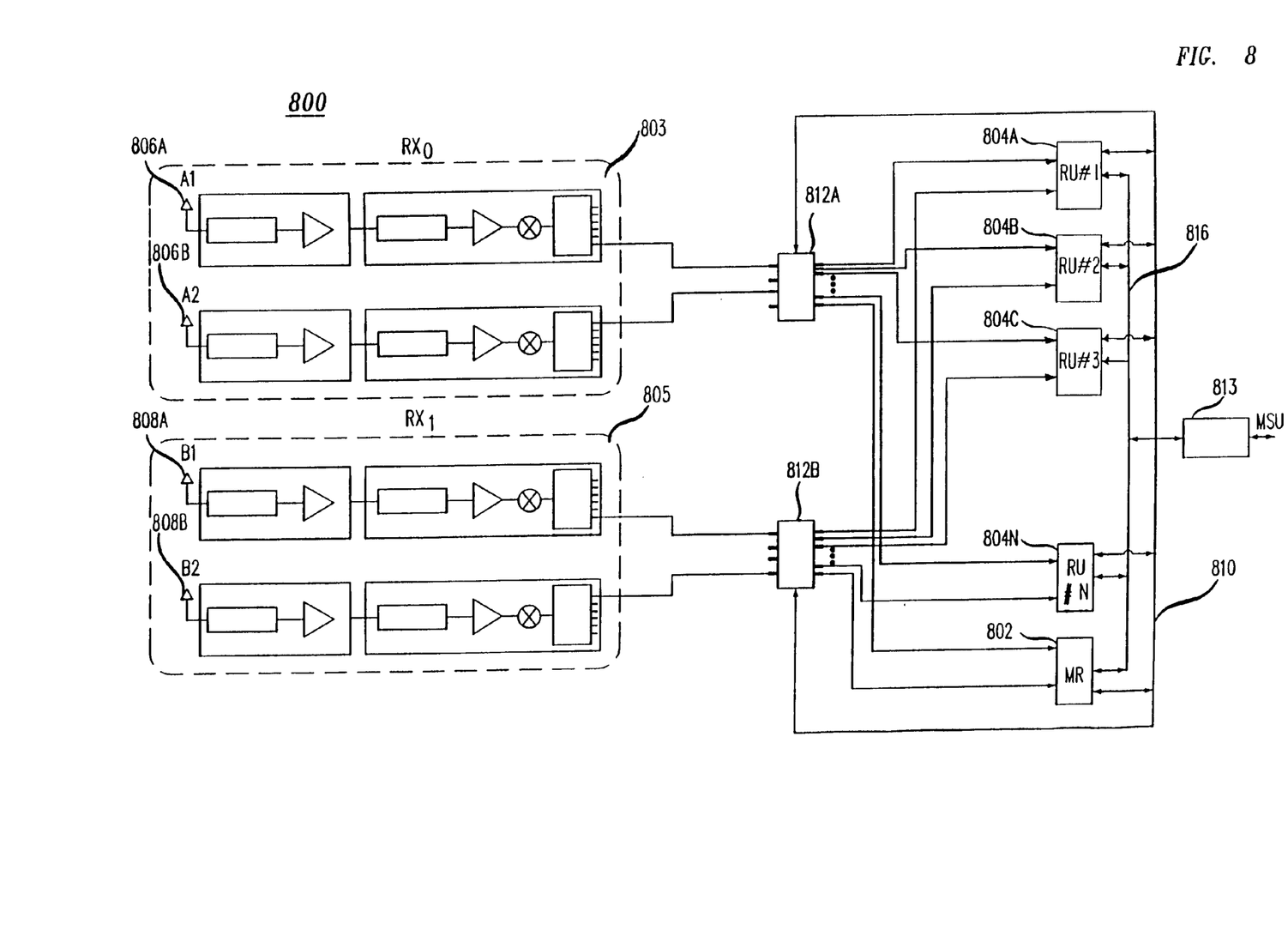
FIG. 8 shows an embodiment of the measurement radio system of FIG. 7.

FIG. 8 illustrates an embodiment of a base station architecture 800 with an measurement radio 802 and N voice/data radios 804a–n for servicing a cell. FIG. 8 only shows receive circuitry 803 (RX0) and 805 (RX1) for servicing one 120 degree receive sector of a cell for the base station 800. In this particular embodiment, each 120 degree sector uses four 60 degree antennas 806a (A1), 806b (A2), 808a (B1) and 808b (B2), where a first group of antennas A1 and A2 are spatially separated from a second group of antennas B1 and B2. The antennas A1 and B1 service the same 60 degree subsector, and the antennas A2 and B2 service the other 60 degree subsector. In this embodiment, a traffic radio 804a–n servicing an active channel for the 120 degree sector uses either antenna A1 or A2 from the first group RX0 and either antenna B1 or B2 from the second group RX1 depending on which set of antennas A1 and B1 or A2 and B2 is selected to service the active channel in the desired manner. For example, the traffic radio 804a–n uses the set of antennas which produces the higher S/I ratio, BER, FER or other desirable parameter. In this embodiment, the measurement radio 802 scans the active channel using the set of antennas A1 and B1 and the set of antennas A2 and B2 and produces operating information for the traffic radio 804a–n to determine which set of antennas 806a and 808a or 806b and 808b for the traffic radio 804a–n to use. As such, in this embodiment, the traffic radio 804a–n services the active channel using two antennas to obtain antenna diversity. Alternatively, the measurement radio 802 could simply scan the active channel using just A1 (or B1) and A2 (or B2) to determine which set of antennas 806a and 808a or 806b and 808b for the traffic radio 804a–n to use. In other embodiments, the measurement radio 802 can scan the active channel using any combination of antennas 806a–b and/or antennas (not shown) which service other sectors in determining the set of antennas for the traffic radio 804a–n to use.

To scan the active channels, the measurement radio 802 sends operating information over a radio antenna control bus 810 to select a set of antennas A1 and B1 or A2 and B2 over which the measurement radio 802 makes certain measurements and/or determinations for the active channel. Based on these measurements and/or determinations, the measurement radio 802 provides operating information for determining which set of antennas the traffic radio 804a–n servicing the active channel will use. The operating information can take the form of antenna selection signals which are sent via a radio communications bus 816 to the traffic radio 804a–n using a designated address for antenna selection signals for the traffic radio 804a–n. In response, the traffic radio 804a–n sends the antenna selection signals over the radio antenna communication bus 810 to the switches 812a–b to select the appropriate set of antennas A1 and B1 or A2 and B2 to be used by the traffic radio 804a–n servicing the active channel. Alternatively, the operating information can take the form of signal quality measurements, such as signal strength, BER, or FER corresponding to a set of antennas. The measurement radio 802 provides this operating information to the traffic radio 804a–n which determines if a switch is desirable to the set of antennas corresponding to the operating information. The measurement radio 802 can provide this information in response to a request from the traffic radio 804a–n which may be experiencing a degrading active channel connection. The measurement radio 802 may simply provide operating information to dedicated storage locations 814 using a bus 816 or to time slots using a time division multiplexed (TDM) bus 816 which are periodically updated to provide operating information corresponding to the current set, the desired set or alternative sets of antennas for the traffic radio 804a–n to use in servicing the active channel.

In a time division multiple access (TDMA) base station where a traffic channel occupies a time slot of a certain frequency carrier and several time slots or TDMA channels make up a frame, the determination of the set of antennas A1 and B1 or A2 and B2 for the traffic channel or time slot can be done over several frames. BER and FER are two parameters which the measurement radio 802 can measure and examine to determine the appropriate set of antennas. As mentioned above, the determination as to whether the appropriate set of antennas for the traffic radio 804a–n is being used to service the active channel can be performed periodically. Alternatively, the determination can be performed when certain signal quality criteria are not achieved by the traffic radio 804*a–n*, when certain signal quality criteria are achieved by the measurement radio 802, upon signal quality comparison between the traffic radio 804*a–n* and the measurement radio 802 and/or upon request from the traffic radio 804*a–n*, the MSC or other base station controller 813, such as a radio control complex (RCC).

To avoid losing data while the antennas servicing the traffic radio are being switched, the measurement radio 802 can measure and/or determine operating information to the traffic radio 804*a–n* for the new set of antennas, such as the AGC coefficients or other operating parameters, coefficients or settings that the traffic radio 804*a–n* can use with the new set of antennas. As such, a relatively seamless hand off for the active channel can occur from one set of antennas to another set of antennas. In a TDMA system, the switch to a new set of antennas can occur between consecutive time slots with no loss of time slot data which could have resulted if the traffic radio had to determine the operating parameters after switching antennas. In situations where sets of antennas services adjacent subsectors within a sector, the measurement radio 802 can provide relatively seamless handoffs for the active channel between subsectors of the sector by providing the AGC coefficients or other operating parameters for the set of antennas to which the active call is being handed off. Additionally, where the measurement radio 802 scans the active channel using sets of antennas corresponding to different sectors of the cell, handoffs between the sectors of the cell can occur seamlessly without the intervention of the radio control complex 813 or the MSC.

Using the measurement radio architecture, the mobile terminal customer would see improved voice and call quality resulting from the seamless handoffs and the passing of operating information from the measurement radio for use by the traffic radios to achieve improved performance.

In the particular embodiment of FIG. 8, selecting the most appropriate set of narrowbeam antennas 806*a–b* and 808*a–b* increases the range of the cell base station 800. This architecture would also reduce interference and improve frequency reuse because the beams are narrow and more focused, as described in the patent application entitled "Intelligent Antenna Sub-sector Switching For Time Slotted Systems" and filed concurrently with the present application and assigned to the same assignee.

In addition to the embodiment described above, alternative configurations of the measurement radio architecture according to the principles of the present invention are possible which omit and/or add components and/or use variations or portions of the described measurement radio architecture. The manner of sending operating information or coefficients between the measurement radio and/or the traffic radios and/or the antenna splitter/combiners/switches depends on the particular application. For example, the addressing and/or storage scheme could be changed. These operating design guidelines also can determine which components can be added, moved, changed or omitted. For example, certain determinations on antenna selection and changing radio operation could be done on the MSC based on the measurements made by the measurement radio, and the measurement radio provides specific operating information to the traffic radio as directed by the MSC or a base station controller.

As would be understood by one of ordinary skill in the art, the various components making up the measurement radio architecture and their respective operating parameters and characteristics should be properly matched up to provide the proper operation. For example, an embodiment of the measurement radio system has been described for use in a TDMA system, such as North American TDMA or Global System For Mobile Communication (GSM), but aspects of the measurement radio architecture can be used in other multiple access systems, such as code division multiple access (CDMA) systems or frequency division multiple access (FDMA) systems. Furthermore, the measurement radio architecture has been described using a particular configuration of distinct components, but it should be understood that the measurement radio architecture and portions thereof can be implemented in application specific integrated circuits, software-driven processing circuitry, firmware or other arrangements of discrete components as would be understood by one of ordinary skill in the art with the benefit of this disclosure. Although in the illustrative embodiment is shown with a particular circuitry, the measurement radio architecture can use different components which together perform similar functions when compared to the circuitry shown. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of providing wireless communications over an active channel, said method comprising the steps of:

receiving said active channel by a measurement radio of said base station using a first antenna set and operating parameters;

performing measurements on said active channel received by said measurement radio with said first antenna set and said operating parameters;

determining from said measurements operating parameters for servicing said active channel using said first antenna set; and providing said determined operating parameters from the measurement radio to a traffic radio to use in communications over said active channel by said traffic radio using said first antenna set.

2. The method of claim 1 wherein said step of receiving said active channel by said measurement radio includes the step of:

selecting different sets of antennas for receiving said active channel by said measurement radio.

3. The method of claim 2 wherein said step of performing further including the step of:

using said different sets of antennas for performing said measurements of said active channel.

4. The method of claim 3 further including the steps of:

changing by said traffic radio from a second antenna set to said first antenna set to service said active channel; and using said determined operating parameters for said traffic radio to service said active channel using said first antenna set.

5. The method of claim 4 wherein said step of providing further includes the step of:

sending said determined operating parameters to dedicated storage locations for said traffic radio.

6. The method of claim 1 further including the step of:

using as said operating parameters operating settings which include at least one of automatic gain control (AGC) settings, filter coefficients, equalizer coefficients and operating coefficients.

7. The method of claim 1 further including the step of:

using as said operating parameters a parameter related to delay spread of said active channel using said first antenna set.

8. The method of claim 1 wherein said step of performing measurements further including:

performing measurements on signals received from a wireless terminal over said active channel.

9. The method of claim 1 wherein said step of performing measurements including the step of:

performing measurements on signals transmitted by said traffic radio over said traffic channel.

10. The method of claim 9 includes the step of:

using said determined operating parameters to change phase, amplitude, or power of transmissions from said traffic radio over said active channel.

11. The method of claim 1 includes the step of:

using as said operating parameters a weight for an infinite impulse response filter for said traffic radio.

12. The method of claim 1 includes the step of:

using as said operating parameters a parameter related to mobile terminal speed.

13. The method of claim 12 includes the step of:

using said determined operating parameters in determining whether said traffic radio is to use equalization or differential detection.

14. A measurement radio system comprising:

traffic radios which service active voice/data channels; and a measurement radio configured to receive an active voice/data channel using a first antenna set and operating parameters to perform measurements of said active voice/data channel and determine from said measurements operating parameters for servicing said active voice/data channel using said first antenna set, said measurement radio providing said determined operating parameters to a traffic radio to use in communications over said active channel by said traffic radio using said first antenna set.

15. The system of claim 14 comprising:

a plurality of antennas for said traffic radios to service said voice/data channels; and said measurement radio scans said active voice/data channel using different sets of said plurality of antennas.

16. The system of claim 15 wherein said traffic radio switches from a second antenna set to said first antenna set to service said active channel, and said determined operating parameters are provided for said traffic radio to service said active channel using said first antenna set.

17. The system of claim 14 wherein said measurement radio is coupled to a radio communications bus which provides to said traffic radio said determined operating parameters.

18. The system of claim 14 wherein said measurement radio is coupled to a radio communications bus and is configured to provide determined operating parameters for said traffic radio to dedicated storage locations for said traffic radio.

19. The system of claim 14 wherein said measurement radio configured to perform measurements on signals received from a wireless terminal over said active channel.

20. The system of claim 14 wherein said measurement radio is configured to perform measurements on signals transmitted by said traffic radio over said active channel.

21. The system of claim 14 wherein said measurement radio is configured to determine delay spread information for said active channel.

22. The system of claim 14 wherein said measurement radio is configured to determine mobile terminal speed information for the mobile terminal on said active channel.

23. The system of claim 14 wherein said determined operating parameters include operating settings which include at least one of automatic gain control (AGC) settings, filter coefficients, equalizer coefficients and operating coefficients.

24. The system of claim 14 wherein said determined operating parameters includes a weight for an infinite impulse response filter for said traffic radio.

25. The system of claim 14 wherein said determined operating parameters are used in determining whether said traffic radio is to use equalization or differential detection.

26. The system of claim 14 wherein said determined operating parameters are used to change phase, amplitude, or power of transmissions from said traffic radio over said active channels.

* * * * *